United States Patent
Chinwangso et al.

(10) Patent No.: US 11,639,461 B2
(45) Date of Patent: May 2, 2023

(54) REVERSIBLE OIL-BASED MUD

(71) Applicant: M-I L.L.C.[, Houston, TX (US)

(72) Inventors: Pawilai Chinwangso, Humble, TX (US); Hui Zhang, Sugar Land, TX (US); Changping Sui, The Woodlands, TX (US); Paulo Pauferro, Jr., Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 855 days.

(21) Appl. No.: 15/999,540

(22) PCT Filed: Feb. 19, 2016

(86) PCT No.: PCT/US2016/018719
§ 371 (c)(1),
(2) Date: Aug. 20, 2018

(87) PCT Pub. No.: WO2017/142557
PCT Pub. Date: Aug. 24, 2017

(65) Prior Publication Data
US 2021/0198552 A1    Jul. 1, 2021

(51) Int. Cl.
*C09K 8/36*     (2006.01)

(52) U.S. Cl.
CPC .................................. *C09K 8/36* (2013.01)

(58) Field of Classification Search
CPC . C09K 8/02; C09K 8/03; C09K 8/032; C09K 8/035; C09K 8/26; C09K 8/265; C09K 8/28; C09K 8/32; C09K 8/34; C09K 8/36; E21B 21/00
See application file for complete search history.

(56) References Cited

U.S. PATENT DOCUMENTS

| | | | |
|---|---|---|---|
| 3,125,517 A * | 3/1964 | Voda | C09K 8/36 507/131 |
| 4,230,586 A * | 10/1980 | Bretz | C09K 8/14 507/131 |
| 4,993,448 A * | 2/1991 | Karydas | C10L 1/328 137/13 |
| 5,260,268 A * | 11/1993 | Forsberg | C09K 8/02 166/301 |
| 5,888,944 A | 3/1999 | Patel | |
| 5,909,779 A | 6/1999 | Patel et al. | |
| 6,218,342 B1 * | 4/2001 | Patel | C09K 8/32 507/129 |
| 6,514,361 B1 * | 2/2003 | Borden | B01F 17/005 149/109.6 |
| 6,790,811 B2 | 9/2004 | Patel | |
| 7,152,697 B2 * | 12/2006 | Horton | C09K 8/28 175/64 |
| 7,238,646 B2 | 7/2007 | Thaemlitz et al. | |
| 2002/0033258 A1 * | 3/2002 | Patel | C09K 8/32 166/308.4 |
| 2004/0147404 A1 | 7/2004 | Thaemlitz et al. | |
| 2008/0200354 A1 | 8/2008 | Jones et al. | |
| 2012/0220501 A1 * | 8/2012 | Mason | C09K 8/36 507/133 |
| 2013/0267444 A1 * | 10/2013 | Thaemlitz | E21B 43/025 507/117 |
| 2014/0121135 A1 | 5/2014 | Gamage et al. | |

FOREIGN PATENT DOCUMENTS

| | | | | |
|---|---|---|---|---|
| CN | 106867494 A | * | 12/2015 | |
| WO | WO-8703613 A2 | * | 6/1987 | .......... C10M 173/02 |
| WO | 2012112654 A2 | | 8/2012 | |

OTHER PUBLICATIONS

Translation of CN-106867494-A, obtained from google patents Aug. 24, 2021 (Year: 2015).*
Zheng et al., Hydrophilic-Lipophilic Balance, Science Direct, Sugar Fatty Acid Esters, 2015 (Year: 2015).*
International Search Report and Written Opinion for the equivalent International Patent Application PCT/US2016/018719 dated Oct. 27, 2016.
International Preliminary Report on Patentability for the equivalent International patent application PCT/US2016/018719 dated Aug. 30, 2018.

* cited by examiner

*Primary Examiner* — Angela M DiTrani Leff

(57) ABSTRACT

A wellbore fluid may include a non-oleaginous internal phase, an oleaginous external phase, and an emulsifier having a molecular weight of at least 700 daltons, whereby the emulsifier may include at least one tertiary amine. A method of completing a wellbore operation may include injecting a wellbore fluid downhole, the wellbore fluid including a non-oleaginous internal phase, an oleaginous external phase, and an emulsifier having a molecular weight of at least 700 daltons. The emulsifier may include at least one tertiary amine. The method may further include injecting a wash fluid comprising a protonating agent downhole.

17 Claims, No Drawings

REVERSIBLE OIL-BASED MUD

BACKGROUND

Many types of fluids have been used in the drilling of oil and gas wells. The selection of an oil-based drilling fluid, also known as oil-based mud, involves a careful balance of both the good and bad characteristics of such fluids in a particular application, the type of well to be drilled, and the characteristics of the oil or gas field in which the well is to be drilled. A surfactant capable of emulsifying incorporated water into the oil is an essential component of oil-based muds.

The primary benefits of selecting an oil-based drilling fluid include: superior hole stability, especially in shale formations; formation of a thinner filter cake than the filter cake achieved with a water-based mud; excellent lubrication of the drilling string and downhole tools; penetration of salt beds without sloughing or enlargement of the hole as well as other benefits that should be known to one of skill in the art.

An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based-muds are used. In contrast oil-based muds provide a thin, slick filter cake which helps to prevent pipe sticking and thus the use of the oil-based mud can be justified.

Despite the many benefits of utilizing oil-based muds, they have disadvantages. In general, the use of oil-based drilling fluids and muds has high initial and operational costs. These costs can be significant depending on the depth of the hole to be drilled. However, often the higher costs can be justified if the oil-based drilling fluid prevents caving in or hole enlargement within a well, which can greatly increase drilling time and costs. Disposal of oil-coated cuttings is another primary concern, especially for off-shore or deep-water drilling operations. In these latter cases, the cuttings must be either washed clean of the oil with a detergent solution which also must be disposed of, or the cuttings must be shipped back to shore for disposal in an environmentally safe manner. Another consideration that must be taken into account are local governmental regulations that may restrict the use of oil-based drilling fluids and muds for environmental reasons.

DETAILED DESCRIPTION

Embodiments disclosed herein relate generally to reversible invert emulsion oil-based muds in which the oil-wet solids in the mud can be converted to water-wet type solids, such as upon an applied trigger. The reversible invert emulsion oil-based muds may be useful in the drilling, completing, or working over of subterranean wells and may have a reduced environmental impact compared to muds with similar properties.

The interfacial tension between an oleaginous fluid, for example, oil, and a non-oleaginous fluid, for example, water, is often high. Thus, if the liquids are mixed together they spontaneously separate from each other when the agitation ceases to minimize the interfacial area. Lowering the interfacial tension with an emulsifier enables one liquid to form a stable dispersion of fine droplets in the other. The lower the interfacial tension, the smaller the droplets and the more stable the emulsion. In most emulsions, the oleaginous fluid is the dispersed phase and the non-oleaginous fluid is the continuous phase. However, "invert emulsions", in which the non-oleaginous fluid is the dispersed phase and the oleaginous fluid is the continuous phase, can be formed upon the use of suitable emulsifiers. One of skill in the art should appreciate that the chemical properties of the emulsifiers are important in the selection of a suitable emulsifier to form stable invert emulsions.

Oil-based muds often contain water, be it unintentionally added during the drilling process (i.e., seepage from penetrated formations or residual water in the hole), or intentionally added water to affect the properties of the drilling fluid or mud. In such water-in-oil type emulsions, also known as invert emulsions, an emulsifier is utilized that will stabilize the emulsion. In general, the invert emulsion may contain both water soluble and oil soluble emulsifying agents. Conventional examples of emulsifiers include polyvalent metal soaps, fatty acids and fatty acid soaps, and other similar suitable compounds that should be known to one of skill in the art.

The use of traditional emulsifiers and surfactants in invert emulsion drilling fluid systems can complicate the clean-up process in open-hole completion operations. Drilling fluids using traditional surfactant and emulsifier materials may require the use of solvents and other surfactant washes to penetrate the filter cake and reverse the wettability of the filter cake particles. That is to say, washing with detergents should convert the oil-wet solids of the filter cake into water-wet solids. Water-wet solids in the filter cake are necessary so that the subsequent acid wash can attack the particles of the mud cake and destroy or remove them prior to production. The productivity of a well is somewhat dependent on effectively and efficiently removing the filter cake while minimizing the potential of water blocking, plugging or otherwise damaging the natural flow channels of the formation. The problems of efficient well clean-up, stimulation, and completion are a significant issue in all wells, and especially in open-hole horizontal well completions.

A typical horizontal well completion process includes one or more of the following: drilling the horizontal section utilizing an oil-based drilling fluid; smoothing directional corrections with a hole opener; displacing the open-hole section with an unused drill-in fluid to minimize solids exposed to the completion assembly; running the completion assembly into the horizontal well; displacing the drill-in fluid with a completion brine; washing the filter cake with solvents and surfactants to remove or wash away the oil-based drilling fluid; destroying the filter cake with an acid soak; and, commencing production. Extension of the time required to clean up the open-hole well can result in wellbore instability and possible collapse. The collapse of a well is generally considered a bad occurrence because the well will then have to be re-drilled or opened up if production from the formation is to occur. Thus, the stability of the open-hole well limits the number of steps performed before commencing production. Thus, there is a tradeoff between increased production due to a fully cleaned-up wellbore and the potential of well collapse due to instability.

In view of the above, an oil-based wellbore fluid or mud emulsion with an environmentally favorable profile that can be easily broken in the presence of an acid soak solution would allow a decrease in the number of steps involved in removing the filter cake and cleaning up the well while minimizing the risk of well collapse. In addition, such a fluid would allow for a more thorough and complete cleaning up of the well thus increasing the production of the well. Thus, in one or more embodiments, the emulsifier may be an amine having a molecular weight of at least 700 Daltons, such as an amine having multiple tertiary fatty amines. That is, the oligomer/polymer backbone may include a plurality of amine groups, each including a fatty alkyl chain therefrom. The oligomer may also include at least one (or at least two in particular embodiments) electrophilic groups per fatty amine present in the molecule. As used herein, a fatty hydrocarbon or fatty amine may refer to a lengthy carbon chain, such as, at least C10.

In one or more embodiments, an invert emulsion wellbore fluid may include an oleaginous fluid, a non-oleaginous fluid, and an improved amine emulsifier having an amine with a molecular weight of at least 700 Daltons, the structure shown in Formula (I) below:

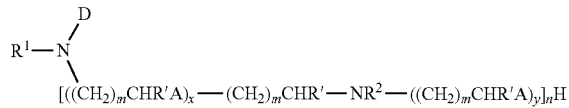
(I)

wherein $R^1$ and $R^2$ are independently selected from a linear or branched $C_{12}$ to $C_{22}$ alkyl group, alkenyl group, alkyl substituted cycloalkyl group, or mixtures thereof; A is independently selected from a monoester group, a diester group, a triester group, an ether group, an amide group, or a CH-substituted by a hydroxyl group; R' is H, or a $C_1$ to $C_3$ alkyl; m is independently 1 or 2; $x+y \geq 2$; n is 2 to 12; D may be another $[((CH_2)_mCHR'A)_x-(CH_2)_mCHR'—NR^2—((CH_2)_mCHR'A)_y]_nH$ group with the same limitations on A, m, x, y and n as described above, or D may be a $((CH_2)_mCHR'E)_zH$ group, wherein m is independently 1 or 2; R' is H, or a $C_1$ to $C_3$ alkyl; E is NH or O; and z is 1, 2, or 3. In one or more embodiments, the amine emulsifier may have a molecular weight (Mw) of greater than 700 daltons. In some embodiments, the Mw may be from about 700 daltons to 7000 daltons. In some embodiments, the $R^1$ group may be an aliphatic $C_{12}$ to $C_{22}$ hydrocarbon and more specifically in some embodiments a non-cyclic aliphatic hydrocarbon. In one or more embodiments, the $R^1$ group may contain at least one unsaturation, for example a carbon-carbon double bond. In some embodiments, the $R^1$ group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ hydrocarbons, or tall oil which is a mixture of $C_{14}$ to $C_{18}$ hydrocarbons.

When a majority of the amine(s) in the emulsifier of the present disclosure is in its unprotonated form, an invert emulsion may be formed in which the oleaginous liquid is the continuous phase and the non-oleaginous liquid is the discontinuous phase. That is to say, the unprotonated form of the amine emulsifier is able to stabilize an invert emulsion. Upon addition of a protonating agent, herein referred to as an acid, that is capable of protonating a majority of the amine(s) in the emulsifier, the oleaginous liquid may become the discontinuous phase and the non-oleaginous liquid may become the continuous phase. In other words, the invert emulsion may be converted to a regular emulsion upon the addition of acid and the protonation of the amine emulsifier. Further, upon addition of a deprotonating agent, herein referred to as a base, that is capable of deprotonating a majority of the protonated amines in the emulsifier, an invert emulsion may be again formed; that is, the invert emulsion of the present disclosure is reversible to an oil-in-water emulsion, and back.

In one or more embodiments, when the majority of the amine(s) in the emulsifer of the present disclosure is/are unprotonated, the emulsifier may have a hydrophilic-lipophilic-balance (HLB) value of between about 3-6. However, when the majority of the amine(s) in the emulsifier of the present disclosure is protonated, the emulsifier may have an HLB value of about above 9. Thus, when the amine(s) is/are predominantly unprotonated, the emulsifier is more lipophilic than hydrophilic, while when the amine is/are predominantly protonated, the emulsifier is more hydrophilic than lipophilic.

In one or more embodiments, the oleaginous fluid is a liquid and more specifically may be a natural or synthetic oil. In one or more embodiments, the oleaginous fluid is selected from the group including diesel oil, mineral oil, a synthetic oil, such as polyolefins, polydiorganosiloxanes, siloxanes or organosiloxanes, and mixtures thereof. The concentration of the oleaginous fluid should be sufficient so that an invert emulsion forms and may be less than about 99% by volume of the invert emulsion. In one or more embodiments, the amount of oleaginous fluid is from about 30% to about 95% by volume or from about 40% to about 90% by volume of the invert emulsion fluid. The oleaginous fluid in one or more embodiments may include at least 5% by volume of a material selected from the group including esters, ethers, acetals, dialkylcarbonates, hydrocarbons, and combinations thereof.

In one or more embodiments, the non-oleaginous fluid used in the formulation of the invert emulsion fluid of the present disclosure is a liquid, such as an aqueous liquid. For example, the non-oleaginous liquid may be selected from the group including sea water, a brine containing organic and/or inorganic dissolved salts, liquids containing water-miscible organic compounds and combinations thereof. The amount of the non-oleaginous fluid is generally less than the theoretical limit needed for forming an invert emulsion. Thus in one or more embodiments, the amount of non-oleaginous fluid is less than about 70% by volume and more specifically from about 1% to about 70% by volume. In some embodiments, the non-oleaginous fluid is from about 5% to about 60% by volume of the invert emulsion fluid.

The amount of the amine emulsifier present in the invert emulsion fluid, as noted above, should be sufficient to stabilize an invert emulsion so that, generally, the emulsion will last for more than about 1 minute after the halting of the agitation or shearing motion that forms the water-in-oil emulsion. While the concentration may vary depending on the particular components in the wellbore fluid or mud, generally the concentration is less than about 10% by volume of the fluid. Thus in one or more embodiments, the amine emulsifier is present in the invert emulsion fluid at a concentration of about 0.1% to 5.0%. More specifically in some embodiments, the amount of amine emulsifier present is about 1% to 5% by volume of the fluid.

As previously noted above, it has been found that the addition of a protonating agent causes the conversion of the invert emulsion, that is to say a water-in-oil type emulsion, into a regular or conventional emulsion, that is to say an oil-in-water type emulsion. To accomplish this conversion the protonating agent, herein referred to as an acid, must be functionally capable of protonating the amine emulsifier. Further, the acid should be of sufficient strength to protonate the amine emulsifier so as to cause the conversion of the emulsion from an invert emulsion to a regular emulsion. Compounds that are suitable for use as an acid include, for example, mineral acids and organic acids that are soluble in water. In one or more embodiments, suitable mineral acids may include hydrochloric acid, sulfuric acid, nitric acid, phosphoric acid, hydrofluoric acid, hydrobromic acid and the like. In one or more embodiments, suitable organic acids may include formic acid, citric acid, tartaric acid, acetic acid, propionic acid, glycolic acid, lactic acid, halogenated acetic acids, butyric acid, organosulfonic acids, organophosphoric acids, and the like. Compounds that generate acid upon dissolution in water may also be used, for example, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, carbon dioxide, and compounds similar to such compounds. Fatty acids may be avoided or used in small amounts so as to not interfere with the reversibility of the amine emulsifier system.

In one or more embodiments, surfactant compounds may be used in conjunction with the amine emulsifiers utilized herein. However, in such cases, it is relevant that the quantity and nature of these supplemental surfactants do not interfere in the ability and properties given the emulsion fluid by the amine emulsifier to act as described herein.

The fluids disclosed herein may be particularly useful in the drilling, completion, and working over of subterranean oil and gas wells in regions that have stringent environmental regulations. For example, the amine emulsifier, having an amine with a molecular weight of at least 700 Daltons, may have favorable biodegradation characteristics and is not considered to be bioaccumulative. Specifically, the fluids disclosed herein may be used as drilling muds and completion fluids that allow for the easy and quick removal of the filter cake, particularly drilling horizontal wells into hydrocarbon-containing formations.

The method used in preparing the fluids described herein is not critical. Conventional methods can be used to prepare the wellbore fluids in a manner analogous to those normally used, to prepare conventional oil-based wellbore fluids. In one representative procedure, a desired quantity of oleaginous fluid such as a base oil and a suitable amount of amine emulsifier are mixed together and the remaining components are added sequentially with continuous mixing. An invert emulsion of the present disclosure is formed by vigorously agitating, mixing or shearing the oleaginous fluid and the non-oleaginous fluid.

In one or more embodiments, the invert emulsion fluids may further contain additional chemicals depending upon the end use of the invert emulsion, so long as they do not interfere with the reversibility of the invert emulsion fluids described herein. For example, wetting agents, organophilic clays, viscosifiers, weighting agents, bridging agents and fluid loss control agents may be added to the fluid compositions to provide for additional functional properties. The addition of such agents should be well known to one of skill in the art of formulating wellbore fluids and muds. However, it should be noted that the addition of such agents should not adversely interfere with the properties imparted by the amine emulsifier as described herein.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these. However, the use of fatty acid wetting agents may be minimized so as to not adversely affect the reversibility of the invert emulsion disclosed herein. SUREWET®, VERSAWET® and FAZEWET® are examples of commercially available wetting agents manufactured and distributed by M-I L.L.C Houston, Tex. that may be used in fluids disclosed herein.

Organophilic clays, normally amine treated clays, may be useful as viscosifiers in one or more embodiments of the fluid compositions of the present disclosure. Other viscosifiers, such as oil soluble polymers, polyamide resins, polycarboxylic acids and soaps can also be used. The amount of viscosifier used in the composition can vary depending upon the end use of the composition. However, in some embodiments about 0.1% to 6% by weight are sufficient for most applications. TRUVIS, VG69, VG-SUPREME and VG-PLUS are organoclay materials distributed by M-I L.L.C. Houston, Tex., and Versa-HRP is a polyamide resin material manufactured and distributed by M-I L.L.C. Houston Tex., that may be used in fluids disclosed herein.

Weighting agents or density materials suitable for use in this fluids disclosed herein include galena, hematite, magnetite, iron oxides, ilmenite, barite, siderite, celestite, dolomite, calcite, and the like. The quantity of such material added, if any, depends upon the desired density of the final composition. In one or more embodiments, weight material is added to result in a drilling fluid density of up to about 24 pounds per gallon. For example, the weight material may be added to achieve a fluid with a weight of at least 9 pounds per gallon and up to 21 pounds per gallon, more specifically up to 19.5 pounds per gallon.

Fluid loss control agents typically act by coating the walls of the borehole as the well is being drilled. Suitable fluid loss control agents which may find utility in fluids disclosed herein include modified lignites, asphaltic compounds, gilsonite, organophilic humates prepared by reacting humic acid with amides or polyalkylene polyamines, and other non-toxic fluid loss additives. In some embodiments, fluid loss control agents are added in amounts of less than about 10% and more specifically less than about 5% by weight of the fluid.

One aspect of drilling subterranean wells with the invert emulsion of the present disclosure is that well clean-up and well stimulation are much easier and quicker to carry out, especially when the well penetrates or comes into contact with a producing formation. As described above, when a conventional invert emulsion drilling fluid is used, cleaning up and stimulating the well may include washing the filter cake with detergents and an acid wash to dissolve the filter cake particles. If these operations are to be fully effective, a significant amount of aqueous detergent and aqueous acid may penetrate the formation resulting in water blockages in the formation which adversely affect production. In addition, time is of the essence when open-hole operations are being conducted because the hole can collapse unexpectedly. Thus, in one or more embodiments, an invert emulsion fluid as described above is used in the drilling, completion and workover of a well. When the invert emulsion fluid comes into contact with a producing formation, a filter cake is formed in a conventional manner. However, instead of washing the hole with a detergent solution prior to acid washing, the use of the invert emulsion drilling fluid of the present disclosure allows for the use of only an acid containing washing solution. Thus, the acid washing solution, the acid being functionally able to protonate the amine emulsifier, is injected into the well so as to convert the emulsion of the filter cake which initially is a water-in-oil type emulsion, into an oil-in-water type emulsion. The acid protonates the amine and the previously oil-wet particles of the filter cake thereby become water-wet allowing the acid to readily reach and dissolve the acid soluble solids in the filter cake. Thus, the removal of the oil based filter cake is easier and the process of cleaning up or stimulating the well is able to be done more effectively and rapidly.

Another aspect of using the invert emulsion fluids of the present disclosure is the ability to effectively wash drill cuttings created during the use of the oil based drilling fluid. As noted above, this is conventionally done with strong detergent solutions that do not allow for the recovery and reuse of the drilling oil. In fact, seemingly "oil-free" cuttings can contain up to 30% oil absorbed to the particle surface of the cuttings. The fluids disclosed herein allow for the replacement of some or all of the detergent solutions with an acid containing solution as a washing fluid for the cuttings. In such an embodiment, the well would be drilled using the wellbore fluids and muds described herein. The resulting cuttings would be separated from the fluid using conventional solids removal methods. The cuttings are contacted at least once with an acid solution so as to invert the emulsion coating the cuttings. Washing with acid may cause the cuttings to convert from being oil-wet to water-wet solids, allowing for the substantial removal of the oleaginous liquid from the cuttings. Once substantially free of oleaginous liquid, the cuttings may be further processed or disposed of. It is possible to recover the oleaginous fluid from the acid wash. In such embodiments, the spent acid wash fluid is admixed with a base solution, thus deprotonating the amine emulsifier. This facilitates recovery of the amine emulsifier and the oleaginous fluid which may be reused in the drilling or other wellbore operation. One of skill in the art should appreciate the benefits of such a system in that the oleaginous fluid is substantially removed from the cuttings and the oleaginous fluid can be recovered for reuse in the drilling or other wellbore operation.

One or more embodiments of the present disclosure relate to a method for the recovery and recycling of the oleaginous fluid in a used oil-based wellbore fluid. In such embodiments, the invert emulsion fluids as described herein are used as the drilling, completing, or workover fluid in a well. The used invert emulsion fluid is collected and admixed with an acid, the acid being functionally able to protonate the amine emulsifier and being in sufficient quantities so as to convert the invert emulsion to a regular emulsion. That is to say, the addition of the acid protonates the amine emulsifier and the water-in-oil type emulsion utilized in drilling the well is converted into an oil-in-water type emulsion. The solids, now substantially water wet, may be separated from the fluid by gravity or mechanical means for further processing or disposal. The fluid may be mixed with a base, the base being functionally able to deprotonate the protonated amine emulsifier. The base should be in sufficient quantities so as to convert the oil-in-water type emulsion formed upon the addition of acid, back to a water-in-oil emulsion. The resulting water-in-oil emulsion may be used as it is downhole or reformulated into a drilling fluid suitable for the drilling conditions in another well.

EXAMPLES

The following examples are included to demonstrate embodiments of the present disclosure. It should be appreciated by those of skill in the art that the techniques and compositions disclosed in the examples which follow represent techniques discovered by the inventors to function well in the practice of this disclosure. However, those of skill in the art should, in light of the present disclosure, appreciate that many changes can be made in the specific embodiments which are disclosed and still obtain a like or similar result without departing from the spirit and scope of the disclosure.

An invert emulsion fluid with an amine emulsifier having an amine with a molecular weight of at least 700 Daltons (Ex. 1), also indicated below as an "improved amine emulsifier" and an invert emulsion fluid with a conventional amine emulsifier (FAZE-MUL available from M-I L.L.C, Houston, Tex.) having a single amine and a molecular weight of less than 700 Daltons, also referred to herein as a "conventional amine emulsifier" (Comparative Ex. 1) were formulated with a oleaginous to non-oleaginous fluid-ratio of 60/40 and 25% by weight calcium chloride for a final density of 9.0 ppg as shown in Table 1. The conventional amine emulsifier in Comparative Example 1, while imparting the reversible properties desired to the invert emulsion wellbore fluid, may have an environmental profile that does not allow for its global use.

TABLE 1

| | Concentration (lb/bbl) | |
|---|---|---|
| Component and/or Function | Example 1 | Comparative Ex. 1 |
| Base Oil | 153.6 | 153.6 |
| Viscosifier | 4 | 4 |
| Lime-pH | 5 | 5 |
| Conventional amine emulsifier | — | 10 |
| Improved amine Emulsifier | 10 | — |
| Wetting Agent | 4 | 4 |
| 11.6 ppg $CaCl_2$ Internal Phase | 102.1 | 102.1 |
| Water Internal Phase | 51.5 | 51.5 |
| Calcium Carbonate Bridging Component | 50 | 50 |

Properties of the formulation fluids are shown in Table 2. Specifically, the electrical stability (ES), rheology, and the amount of acid needed to reverse the emulsion (i.e., "reversibility"). In the reversibility test, 57% citric acid is added in increments of 5 mL. Electrical stability and fluid dispersion in water are measured to test if the fluid has become reversed or water-wet instead of oil-wet (e.g., an ES<10 V and that it is dispersible in water).

TABLE 2

| | Example 1 | | Comparative Ex. 1 | |
|---|---|---|---|---|
| Property | Initial | 16 hour HR @ 180° F. | Initial | 16 hour HR @ 180° F. |
| ES, Volts | 195 | 523 | 682 | 324 |
| Rheology Temp. | 150° F. | 150° F. | 120° F. | 120° F. |
| 600 rpm | 42 | 42 | 57 | 38 |
| 300 rpm | 29 | 29 | 41 | 24 |
| 200 rpm | 23 | 23 | 34 | 19 |
| 100 rpm | 17 | 17 | 25 | 14 |
| 6 rpm | 8 | 8 | 11 | 6 |
| 3 rpm | 8 | 7 | 9 | 4 |
| PV, cP | 14 | 13 | 16 | 14 |
| YP, 100 lb/ft$^2$ | 14 | 16 | 25 | 10 |
| Reversibility | 5 mL | 5 mL | 5 mL | 5 mL |
| Dispersion in Water (after addition of acid) | Immediately | Immediately | Immediately | Immediately |

An ES value of higher than 300 V represents a stable invert emulsion fluid (water-in-oil type emulsion). Thus, the improved amine emulsifier of the present disclosure shows acceptable emulsion stability after hot rolling and, similar to Comparative Example 1, converted from an invert emulsion to a conventional emulsion and thereby became water-wet after the first 5 mL acid treatment.

Table 3 shows the fluid loss control properties of each fluid after being hot rolled (HR) at 180° F. A 10 micron Aloxite disc (FAO-00) was used and the test was run at 180° F. with 500 psi differential pressure. The formulation of Example 1 shows similar fluid loss control to the Comparative Example 1 formulation.

TABLE 3

| Fluid Loss Test | Example 1 | Comparative Ex. 1 |
| --- | --- | --- |
| Temp. (° F.) | 180 | 180 |
| Medium | Aloxite Disc (FAO-00) | Aloxite Disc (FAO-00) |
| Diff. Pressure (psi) | 500 | 500 |
| Spurt | 2 | 3.4 |
| 1 min | 2.5 | 3.9 |
| 5 min | 3 | 4.4 |
| 10 min | 3.5 | 5 |
| 15 min | 4 | 5.6 |
| 30 min | 4.5 | 6.4 |
| 1 hour | 5.5 | 6.6 |

Two additional formulations, similar to those shown above, were prepared with the use of a wetting agent, SUREWET available from M-I L.L.C, Houston Tex., for example, that has an improved environmental profile, as compared to the wetting agent of Table 1. The details of Example 2 and Comparative Example 2 are shown in Table 4 below. The formulations were prepared to have an oleaginous to non-oleaginous fluid-ratio of 60/40 and 35% by weight calcium chloride for a final density of 10.0 ppg as shown in Table 4.

TABLE 4

| | Concentration (lb/bbl) | |
| --- | --- | --- |
| Component and/or Function | Example 2 | Comparative Ex. 2 |
| Base Oil | 150 | 150 |
| Viscosifier | 4 | 4 |
| Lime-pH | 4 | 4 |
| Conventional amine emulsifier | — | 12 |
| Improved amine emulsifier | 12 | — |
| Wetting Agent | 4 | 4 |
| 11.6 ppg CaCl$_2$ Internal Phase | 157 | 157 |
| Water Internal Phase | 12 | 12 |
| Calcium Carbonate Bridging Component | 90 | 90 |

Table 5 shows properties of the formulation fluids. Example 2 had an ES value below 200 V directly after formulation, indicating that an invert emulsion was not achieved initially, however upon static aging for 16 hours at ambient temperature the ES value rose to above 300 V indicating the formation of the invert emulsion. The invert emulsion fluid of Example 2 maintained its stability after undergoing a hot rolling process. The fluid formed as Comparative Example 2 showed a decrease in its ES after the ambient aging and hot rolling procedures, but did require less acid than the fluid of Example 1 to convert to a conventional emulsion and become water wet and dispersible in water.

TABLE 5

| | Example 2 | | | Comparative Ex. 2 | | |
| --- | --- | --- | --- | --- | --- | --- |
| Property | Initial | 16 hour static @ ambient | 16 hour HR @ 180° F. | Initial | 16 hour static @ ambient | 16 hour HR @ 180°F |
| ES, Volts | 160 | 495 | 473 | 1170 | 936 | 510 |
| Rheology Temp. | 150° F. | 150° F. | 150° F. | 150° F. | 150° F. | 150° F. |
| 600 rpm | 56 | 57 | 42 | 50 | 49 | 40 |
| 300 rpm | 38 | 39 | 26 | 33 | 33 | 25 |
| 200 rpm | 31 | 32 | 20 | 27 | 27 | 20 |
| 100 rpm | 23 | 24 | 14 | 19 | 20 | 14 |
| 6 rpm | 11 | 12 | 7 | 8 | 9 | 7 |
| 3 rpm | 10 | 11 | 6 | 7 | 8 | 6 |
| PV, cP | 18 | 18 | 16 | 17 | 16 | 15 |
| YP, 100 lb/ft$^2$ | 20 | 21 | 10 | 16 | 17 | 10 |
| Reversibility | — | — | 10 mL | — | — | 5 mL |
| Dispersion in Water (after addition of acid) | — | — | w/ slight agitation | — | — | w/ slight agitation |

Table 6 shows fluid loss data of both formulations (Ex. 2 and Comp. Ex. 2) at 200° F. Both fluid loss data are comparable with no non-oleaginous fluid in their oleaginous filtrates. This indicates that both fluids form stable invert emulsions and only oleaginous fluid which is the continuous phase leaks out as a filtrate.

TABLE 6

| Fluid Loss Test | Example 2 | Comparative Ex. 2 |
| --- | --- | --- |
| Temp. (° F.) | 200 | 200 |
| Medium | Aloxite Disc (FAO-00) | Aloxite Disc (FAO-00) |
| Diff. Pressure (psi) | 500 | 500 |
| Spurt | 2 | 0.5 |
| 1 min | 3.5 | 1.5 |
| 5 min | 4.5 | 3 |
| 10 min | 5 | 3.5 |
| 15 min | 5.5 | 4 |
| 30 min | 6 | 4.5 |
| 1 hour | 7 | 5.7 |
| 4 hour | 9.8 (no water) | 9 (no water) |
| Filter cake thickness (mm) | 2.5 | 2.3 |

Table 7 shows the formulation details of two fluids, Comparative Example 3 that is formulated with a wetting agent that cannot be used globally due to stringent environmental regulations and Example 3 that is formulated using only 2 ppb of an a wetting agent (e.g., SUREWET), which is used below as wetting agent #2, with an improved environmental profile. Comparative Example 3 represents a FAZEPRO™ system, a conventional reversible oil-based drilling fluid utilizing a combination of emulsifiers, such as FAZE-MUL™ and FAZEWET™, all available from M-I L.L.C, Houston Tex.

TABLE 7

| | Concentration (lb/bbl) | |
| --- | --- | --- |
| Component and/or Function | Example 3 | Comparative Ex. 3 |
| Base Oil | 153.6 | 153.6 |
| Viscosifier | 4 | 4 |
| pH | 5 | 5 |
| Conventional amine emulsifier | — | 12 |
| Improved amine emulsifier | 12 | — |

TABLE 7-continued

| | Concentration (lb/bbl) | |
|---|---|---|
| Component and/or Function | Example 3 | Comparative Ex. 3 |
| Wetting Agent#1 | — | 4 |
| Wetting Agent #2 | 2 | — |
| 11.6 ppg CaCl$_2$ Internal Phase | 102.1 | 102.1 |
| Water Internal Phase | 51.5 | 51.5 |
| Calcium Carbonate Bridging Component | 50 | 50 |

Table 8 shows properties of the formulation fluids from Example 3 and Comparative Ex. 3. By using less of wetting agent #2, the reversibility of Example 3 improves, i.e., less acid, as compared to that of Example 2 where more of the same wetting agent is used.

TABLE 8

| | Example 3 | | Comparative Ex. 3 | |
|---|---|---|---|---|
| Property | Initial | 16 hour HR @ 180° F. | Initial | 16 hour HR @ 180° F. |
| ES, Volts | 172 | 437 | 216 | 479 |
| Rheology Temp. | 120° F. | 120° F. | 120° F. | 120° F. |
| 600 rpm | 57 | 32 | 58 | 41 |
| 300 rpm | 41 | 20 | 42 | 28 |
| 200 rpm | 34 | 15 | 34 | 22 |
| 100 rpm | 26 | 10 | 26 | 16 |
| 6 rpm | 13 | 4 | 12 | 6 |
| 3 rpm | 12 | 3 | 11 | 5 |
| PV, cP | 16 | 12 | 16 | 13 |
| YP, 100 lb/ft$^2$ | 25 | 8 | 26 | 15 |
| Reversibility Dispersion in Water (after addition of acid) | — | 5 mL w/slight agitation | — | 5 mL Immediately |

Table 9 shows fluid loss data of both formulation fluids (Ex. 3 and Comparative Ex. 3) at 180° F. Fluid loss of Example 3 is similar to that of Example 2. This shows that 2 ppb of SUREWET, a wetting agent (available from M-I L.L.C, Houston Tex.), is sufficient to provide practical fluid properties.

TABLE 9

| Fluid Loss Test | Example 3 | Comparative Ex. 3 |
|---|---|---|
| Temp. (° F.) | 180 | 180 |
| Medium | Aloxite Disc (FAO-00) | Aloxite Disc (FAO-00) |
| Diff. Pressure (psi) | 500 | 500 |
| Spurt | 3.2 | 1.9 |
| 1 min | 3.8 | 2.4 |
| 4 min | 4.2 | 2.9 |
| 9 min | 4.8 | 3.4 |
| 16 min | 5.2 | 3.8 |
| 25 min | 5.8 | 4.2 |
| 30 min | 6 | 4.4 |
| 36 min | 6.2 | 5 |

Table 10 shows return-to-flow data which is a calculation of percentage of a final flowrate (mL/sec) after a breaker soak compared to the initial flowrate of a clean Aloxite disc before filter cake formation. This test is essential to evaluate and prove the concept that the candidate emulsifier can function as a reversible emulsifier to create water-wet filter cake; therefore, enhancing cleanup after breaker treatment. Breaker tests were conducted using a FAZEOUT breaker formulation (available from M-I L.L.C, Houston Tex.) which includes an acid precursor (25%), a chelant (5%), and a surfactant breaker package (8%). Each Example 3 and Comparative Ex. 3 fluid was used to form a filter cake on a 10 micron Aloxite disc at 180° F. under differential pressure of 500 psi for 4 hours. Both filter cakes were exposed to the aforementioned breaker solution at 180° F. under differential pressure of 100 psi for 3 days. Cleanup efficiency was evaluated by flowing liquid medium through the Aloxite disc and residue filter cake in both injection (wellbore to formation) and production (formation to wellbore) directions. Right after soak, the direct injection was measured first by injecting the spent breaker directly into the disc. The breaker was decanted and replaced with fresh water and the injection with water was measured, followed by the production.

TABLE 10

| Property | Example 3 | Comparative Ex. 3 |
|---|---|---|
| Temp. (° F.) | 180 | 180 |
| Breaker Soak Time | 3 days | 3 days |
| | Return-to-Flow | |
| Breaker Injection | 6% | 15% |
| Water Injection | 70% | 75% |
| Production | 92% | 79% |

The data shows that the return-to-flow for both fluids in Example 3 and Comparative Ex. 3 are comparable. Although the direct breaker injection was not high, after replacing the spent breaker with water, the injectivity improved dramatically. This result indicates that the disc was possibly mostly clean after soak with only a small amount of filter cake residue on the disc itself and some solid residue in the spent breaker fluid. Injecting this solid residue into the disc diminished the flow of liquid resulting in the lower return-to-flow values. After replacing this spent breaker with fresh water, most of the solids were removed leading to higher water injectivity followed by exceptional production return-to-flow.

To design wash fluid treatment suitable for direct injection operations, reactive acid solution and coarser filter medium were selected. Table 11 shows return-to-flow data measured after the filter cakes were treated with 15% HCl wash fluid. Each Example 3 and Comparative Ex. 3 fluid was used to form a filter cake on a 60 micron Aloxite disc at 180° F. under a differential pressure of 500 psi for 4 hours. Both filter cakes were exposed to 15% HCl solution at 180° F. under a differential pressure of 100 psi for 2 hours. Cleanup efficiency was evaluated by injecting water through a spent acid solution directly into the disc (i.e., acid injection). The spent acid solution was decanted and replaced with fresh water and the injection with water was measured (i.e., water injection). Resulting data shows that direct injection (i.e., acid injection in this example) greater than 50% can be achieved with a more reactive protonating agent (i.e., 15% HCl vs FAZEOUT as seen in Table 11 and Table 10, respectively).

TABLE 11

| Property | Example 3 | Comparative Ex. 3 |
|---|---|---|
| Temp. (° F.) | 180 | 180 |
| Acid Soak Time | 2 hours | 2 hours |
| Medium | Aloxite Disc (FAO-20) | Aloxite Disc (FAO-20) |
| Return-to-Flow | | |
| Acid Injection | 58% | 83% |
| Water Injection | 66% | 94% |

Although only few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

What is claimed:

1. A wellbore fluid comprising:
a non-oleaginous liquid;
an oleaginous liquid; and
an amine emulsifier having a molecular weight of about 700 to 7,000 daltons, and present in an amount of about 0.1% to 10% by volume of the wellbore fluid,
wherein, when a majority of the tertiary fatty amines in the amine emulsifier is in an unprotonated form, the oleaginous liquid is a continuous phase and the non-oleaginous liquid is a discontinuous phase such that the amine emulsifier stabilizes a water-in-oil emulsion comprising the oleaginous liquid as the continuous phase and the non-oleaginous liquid as the discontinuous phase and, when a majority of the tertiary fatty amines is in a protonated form, the oleaginous liquid is the discontinuous phase and the non-oleaginous liquid is the continuous phase such that the water-in-oil emulsion converts to an oil-in-water emulsion comprising the non-oleaginous liquid as the continuous phase and the oleaginous liquid as the discontinuous phase;
wherein the amine emulsifier is according to Formula (I):

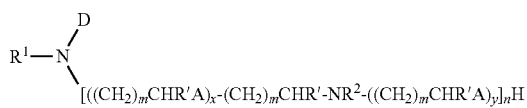

(I)

wherein $R^1$ and $R^2$ are independently selected from a linear or branched $C_{12}$ to $C_{22}$ alkyl group, alkenyl group, alkyl substituted cycloalkyl group, or mixtures thereof, A is independently selected from a monoester group, a diester group, a triester group, an ether group, an amide group, or a CH-substituted by a hydroxyl group; R' is H, or a $C_1$ to $C_3$ alkyl; m is independently 1 or 2; x+y≥2; n is 2 to 12; D is either another $[((CH_2)_mCHR'A)_x\text{-}(CH_2)_mCHR'\text{—}NR^2\text{—}((CH_2)_mCHR'A)_y]_nH$ group with the same limitations on A, m, x, y and n as described above, or D is a $((CH_2)_mCHR'E)_zH$ group, wherein m is independently 1 or 2; R' is H, or a $C_1$ to $C_3$ alkyl; E is NH or O; and z is 1, 2, or 3.

2. The wellbore fluid of claim 1, wherein at least one tertiary fatty amine of the tertiary fatty amines is substituted by a fatty hydrocarbon chain.

3. The wellbore fluid of claim 2, wherein the amine emulsifier includes an electrophilic group in the fatty hydrocarbon chain.

4. The wellbore fluid of claim 1, wherein, the amine emulsifier has a hydrophilic-lipophilic-balance (HLB) value between about 3 and 6.

5. The wellbore fluid of claim 1, wherein the amount of oleaginous liquid is from about 30% to about 95% by volume of the wellbore fluid.

6. The wellbore fluid of claim 1, wherein the amount of non-oleaginous liquid is from about 1% to about 70% by volume of the wellbore fluid.

7. The wellbore fluid of claim 1, wherein the wellbore fluid has a density of about 9 to 21 pounds per gallon.

8. The wellbore fluid of claim 1, further comprising:
at least one selected from the group of wetting agents, organophilic clays, viscosifiers, weighting agents, bridging agents and fluid loss control agents.

9. A method of completing a wellbore operation, the method comprising:
injecting the wellbore fluid of claim 1 downhole.

10. The method of claim 9, further comprising:
injecting a wash fluid comprising a protonating agent downhole.

11. The method of claim 10, wherein the protonating agent is at least one mineral acid selected from the group including hydrochloric acid, sulfuric acid, nitric acid, phosphoric acid, hydrofluoric acid, and hydrobromic acid.

12. The method of claim 10, wherein the protonating agent is at least one organic acid or compound that generates acid upon dissolution in water selected from the group including formic acid, citric acid, tartaric acid, acetic acid, propionic acid, glycolic acid, lactic acid, halogenated acetic acids, butyric acid, organosulfonic acids, organophosphoric acids, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, and carbon dioxide.

13. The method of claim 10, further comprising:
withdrawing a substantial portion of the wellbore fluid from downhole prior to injecting the wash fluid downhole.

14. The method of claim 9, wherein at least one tertiary fatty amine of the tertiary fatty amines is substituted by a fatty hydrocarbon chain.

15. The method of claim 14, wherein the emulsifier includes an electrophilic group in the fatty hydrocarbon chain.

16. A wellbore fluid comprising:
a non-oleaginous liquid;
an oleaginous liquid; and
an amine emulsifier having a molecular weight of about 700 to 7,000 daltons and comprising tertiary fatty amines,
wherein, when a majority of the tertiary fatty amines in the amine emulsifier is in an unprotonated form, the amine emulsifier has a first hydrophilic-lipophilic-balance (HLB) value between about 3 and 6 and, when a majority of the tertiary fatty amines in the amine emulsifier is in a protonated form, the amine emulsifier has a second HLB value of 9 to 20; wherein the amine emulsifier is according to Formula (I):

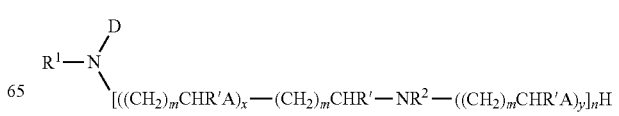

(I)

wherein $R^1$ and $R^2$ are independently selected from a linear or branched $C_{12}$ to $C_{22}$ alkyl group, alkenyl group, alkyl substituted cycloalkyl group, or mixtures thereof; A is independently selected from a monoester group, a diester group, a triester group, an ether group, an amide group, or a CH-substituted by a hydroxyl group; R' is H, or a $C_1$ to $C_3$ alkyl; m is independently 1 or 2; x+y≥2; n is 2 to 12; D is either another $[((CH_2)_m CHR'A)_x\text{-}(CH_2)_m CHR'\text{—}NR^2\text{—}((CH_2)_m CHR'A)_y]_n H$ group with the same limitations on A, m, x, y and n as described above, or D is a $((CH_2)_m CHR'E)_z H$ group, wherein m is independently 1 or 2; R' is H, or a $C_1$ to $C_3$ alkyl; E is NH or O; and z is 1, 2, or 3.

17. A wellbore fluid comprising:
an invert emulsion that is reversible from a water-in-oil emulsion to an oil-in-water emulsion, wherein the invert emulsion comprises:
  a non-oleaginous liquid;
  an oleaginous liquid; and
  an amine emulsifier having a molecular weight of about 700 to 7,000 daltons; wherein the amine emulsifier is according to Formula (I):

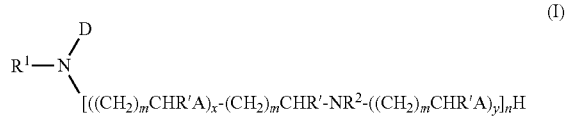
(I)

wherein $R^1$ and $R^2$ are independently selected from a linear or branched $C_{12}$ to $C_{22}$ alkyl group, alkenyl group, alkyl substituted cycloalkyl group, or mixtures thereof, A is independently selected from a monoester group, a diester group, a triester group, an ether group, an amide group, or a CH-substituted by a hydroxyl group; R' is H, or a $C_1$ to $C_3$ alkyl; m is independently 1 or 2; x+y≥2; n is 2 to 12; D is either another $[((CH_2)_m CHR'A)_x\text{-}(CH_2)_m CHR'\text{—}NR^2\text{—}((CH_2)_m CHR'A)_y]_n H$ group with the same limitations on A, m, x, y and n as described above, or D is a $((CH_2)_m CHR'E)_z H$ group, wherein m is independently 1 or 2; R' is H, or a $C_1$ to $C_3$ alkyl; E is NH or O; and z is 1, 2, or 3.

* * * * *